(12) United States Patent
Murray

(10) Patent No.: US 11,995,044 B2
(45) Date of Patent: May 28, 2024

(54) CONFIGURABLE STACKING/STACKABLE FILESYSTEM (CSF)

(71) Applicant: Zettaset, Inc., Mountain View, CA (US)

(72) Inventor: Eric A. Murray, Los Gatos, CA (US)

(73) Assignee: Zettaset, Inc., Mountain View, CA (US)

(*) Notice: Subject to any disclaimer, the term of this patent is extended or adjusted under 35 U.S.C. 154(b) by 336 days.

(21) Appl. No.: 17/668,546

(22) Filed: Feb. 10, 2022

(65) Prior Publication Data

US 2022/0261381 A1 Aug. 18, 2022

Related U.S. Application Data

(60) Provisional application No. 63/148,960, filed on Feb. 12, 2021.

(51) Int. Cl.
*G06F 16/188* (2019.01)
*G06F 16/17* (2019.01)

(52) U.S. Cl.
CPC ........ *G06F 16/188* (2019.01); *G06F 16/1734* (2019.01)

(58) Field of Classification Search
CPC ............................ G06F 16/188; G06F 16/1734
See application file for complete search history.

(56) References Cited

U.S. PATENT DOCUMENTS

| | | | | |
|---|---|---|---|---|
| 8,438,315 B1* | 5/2013 | Tao | ................ | G06F 3/0659 |
| | | | | 710/5 |
| 8,868,626 B2* | 10/2014 | Iftode | ................ | G06F 16/11 |
| | | | | 707/825 |
| 10,140,462 B2* | 11/2018 | Reddy | ................ | G06F 21/6218 |
| 2005/0273858 A1* | 12/2005 | Zadok | ................ | H04L 67/06 |
| | | | | 709/230 |

(Continued)

FOREIGN PATENT DOCUMENTS

| | | |
|---|---|---|
| WO | 2007-085083 A1 | 8/2007 |
| WO | 2010-065271 A2 | 6/2010 |

OTHER PUBLICATIONS

Wright et al. "NCryptfs: A Secure and Convenient Cryptographic File System", Jun. 9, 2003, pp. 197-210. (Year: 2003).*

(Continued)

*Primary Examiner* — Matthew J Ellis
(74) *Attorney, Agent, or Firm* — Asif Ghias

(57) ABSTRACT

Techniques are disclosed for a configurable stackable filesystem (CSF) that interfaces with an underlying filesystem and client applications via a virtual filesystem interface (VFS). The CSF can perform a variety of operations on its files and directories. The operations implemented by the CSF can be configured to be performed via a configuration file on the specified files/directories. These operations comprise monitoring/logging including permissions and access control lists (ACL) changes, encryption, compression, rate-limiting and time-of-use enforcement, etc. The configuration file can be updated and loaded into the CSF with immediate (Continued)

effect at runtime, and without requiring to unmount the CSF and disrupting the processes using it. The CSF itself is advantageously modularly implemented as multiple layers or individual CSFs each specializing in one type of operation.

20 Claims, 3 Drawing Sheets

(56) References Cited

U.S. PATENT DOCUMENTS

| | | | | |
|---|---|---|---|---|
| 2006/0117298 | A1* | 6/2006 | Delapedraja | G06F 16/10 717/120 |
| 2008/0320316 | A1* | 12/2008 | Waldspurger | H04L 63/083 713/189 |
| 2009/0030935 | A1* | 1/2009 | Kurichiyath | G06F 16/17 |
| 2017/0060893 | A1* | 3/2017 | Taveniku | G06F 16/188 |
| 2018/0375841 | A1* | 12/2018 | Tola | H04L 63/0464 |
| 2019/0074967 | A1* | 3/2019 | Stuntebeck | G06F 16/13 |
| 2020/0004962 | A1* | 1/2020 | Araujo | G06F 21/568 |
| 2022/0150056 | A1* | 5/2022 | Falk | G06F 21/57 |

OTHER PUBLICATIONS

Schermerhorn et al. "User-Level Extensibility in the Mona File System", Jul. 11, 2001, pp. 173-183. (Year: 2001).*

Bijlani et al. "Extension Framework for File Systems in Userspace", pp. 21-134, Jul. 10, 2019. (Year: 2019).*

Aranya et al, "Tracefs: A File System to Trace Them All", Third USENIX Conference on File and Storage Technologies (FAST), pp. 129-145, Mar. 31, 2004, Stony Brook University, Stony Brook, NY, USA.

Bijani_et_al, "Extension Framework for File Systems in User space", USENIX Annual Technical Conference, pp. 121-134, Jul. 10, 2019, USENIX, Renton, WA, USA.

ECRYPTFS, "An Enterprise-Class Cryptographic Filesystem For Linux", UBUNTU (manpages.ubuntu.com/manpages/hirsute/en/man7/ecryptfs.7.html), Feb. 24, 2021, pp. 1-6, Canonical Ltd., London, UK.

FIST, "FiST: Stackable File System Language and Templates", https://www.filesystems.org, Feb. 12, 2021, pp. 1-6, https://www.filesystems.org, AZ, USA.

Schermerhorn et al., "User-Level Extensibility in the Mona File System", USENIX Annual Technical Conference, FREENIX Track, Jul. 11, 2001, pp. 173-183, USENIX, Boston, MA, USA.

Wright et al, "NCryptfs: A Secure and Convenient Cryptographic File System", USENIX Annual Technical Conference, General Track, Jun. 9, 2003, pp. 197-210, USENIX, San Antonio, TX, USA.

Zadok et al, "Cryptfs: A Stackable Vnode Level Encryption File System", Technical Report CUCS-021-98, pp. 1-14, vol. 184, Jul. 28, 1998, Computer Science Department, Columbia University, New York, NY, USA.

* cited by examiner

CONFIGURABLE STACKING/STACKABLE FILESYSTEM (CSF)

RELATED APPLICATIONS

This application claims priority from U.S. Provisional Patent Application No. 63/148,960 filed on Feb. 12, 2021 and which is incorporated by reference herein for all purposes in its entirety.

FIELD OF THE INVENTION

This invention generally relates to the field of filesystems and specifically to the field of configurable stacking/stackable filesystems.

BACKGROUND

Stackable filesystems can stack on top of each other, each layer performing a certain task and passing system calls down to the next layer in the stack. There is plenty of prior art for stackable filesystems. U.S. Patent Publication No. 2005/0273858 A1 to Zadok et al. discloses an operating system kernel, including a protocol stack and a network layer for receiving a message from a data network. There is a stackable filesystem layer coupled to the network layer for inspecting a message with the stackable filesystem layer is coupled to a storage device. The stackable filesystem determines and stores filesystem level information determined from the message. There is a wrapped filesystem containing the file targeted by the message coupled to the stackable filesystem layer for receiving the message inspected by the stackable filesystem.

U.S. Patent Publication No. 2020/0004962 A1 to Araujo et al. discusses a stackable filesystem that transparently tracks process file writes for forensic analysis. The filesystem comprises a base filesystem, and an overlay filesystem. Processes see the union of the upper and lower filesystems, but process writes are only reflected in the overlay. By providing per-process views of the filesystem using this stackable approach, a forensic analyzer can record a process's file-based activity-file creation, deletion, modification. These activities are then analyzed to identify indicators of compromise (IoCs). These indicators are then fed into a forensics analysis engine, which then quickly decides whether a subject (e.g., process, user) is malicious. If so, the system takes some proactive action to alert a proper authority, to quarantine the potential attack, or to provide other remediation. The approach enables forensic analysis without requiring file access mediation, or conducting system event-level collection and analysis and thus making it a lightweight, and non-intrusive solution.

U.S. Pat. No. 8,868,626 B2 to Iftode et al. teaches a system and method for controlling a filesystem. In some embodiments, a control plane interposes between a data plane user and a data plane intercepts filesystem operations, and performs control plane operations upon the filesystem operations. In one such embodiment, the system and method is implemented between a data plane user that is a local filesystem user and a data plane that is a local filesystem. In another such embodiment, the system and method is implemented between a data plane user that is a client and a data plane that is a file server. Furthermore, for an embodiment where the control plane that interposes between a client and a file server, the control plane can be implemented as a filesystem proxy. Control plane operations include, but are not limited to, observation, verification, and transformation of a filesystem operation.

U.S. Pat. No. 10,140,462 B2 to Reddy et al. discloses a computing device and method for managing file access control policies on a computing device. The method includes maintaining file-access policies in user space, receiving, at a kernel level, from a user in user space, a request to access a file, and directing the request from the kernel level to a file-policy manager in user space. At least one of the file-access policies is enforced in user space with the file-policy manager to grant or deny access to the file, and file operations are performed on the file using only kernel-level calls when access to the file is granted. U.S. Patent Publication No. 2006/0117298 A1 to Delapedraja et al. describes a stacked filesystem that includes a first module and a second module, the first module includes executable code that has distinct functionality from executable code of the second module. There is logic configured to create a stack template comprising information about the stack.

International Patent Publication No. WO 2010/065271 A2 to Yang discloses a system and method for providing continuous file protection in a computer processing system. In accordance with an embodiment, the system includes a configuration module, a filter driver, and a storage module. The configuration module permits a user to elect certain files or folders for protection. The configuration module runs at an application layer without involving the computer processing system's operating system. The filter driver intercepts and splits write input and outputs addressed at protected files or folders. The storage module is also run without involving the computer processing system's operating system. The storage module is for performing functions including data logging, version managements, and data recovery.

The article entitled, "Cryptfs: A Stackable Vnode Level Encryption Filesystem" dated Jul. 28, 1998 by Zadok et al. of Columbia University argues that data encryption has become an increasingly important factor in everyday work. Users seek a method of securing their data with maximum comfort and minimum additional requirements on their part. They are that the users want a security system that protects any files used by any of their applications, without resorting to application-specific encryption methods. Performance is an important factor to users since encryption can be time consuming. Operating system vendors want to provide this functionality but without incurring the large costs of developing a new filesystem.

The article further describes the design and implementation of Cryptfs—a filesystem that was designed as a stackable Vnode layer loadable kernel module. Cryptfs operates by "encapsulating" client filesystem with a layer of encryption transparent to the user. Being kernel resident, Cryptfs performs better than user-level or NFS based file servers such as cryptographic filesystem (CFS) and transparent CFS (TCFS). It is 2 to 37 times faster on micro-benchmarks such as read and write; this translates to 12-52% application speedup, as exemplified by a large build. Cryptfs offers stronger security by basing its keys on process session IDs as well as user IDs, and by the fact that kernel memory is harder to access. They state, that working at and above the vnode level, Cryptfs is more portable than a filesystem which works directly with native media such as disks and networks.

The article further asserts that Cryptfs can also operate on top of any other native filesystem such as UFS/FFS and NFS. Finally, Cryptfs requires no changes to client filesystems or remote servers. Other prior art includes eCryptfs (for Enterprise Cryptographic Filesystem), which is a stackable filesystem and can purportedly perform file-based encryption. Still other prior art systems mentioned at website: https://www.filesystems.org/ include Snoopfs, cryptfs and aclfs, which are stackable and purportedly perform monitoring, encryption and access control lists (ACLs).

Despite the plethora of prior art, there are no teachings for a stackable filesystem that is configurable to perform a variety of operations on its files/directories. There is further no prior art for a stackable filesystem that can be configured at runtime, and without requiring to unmount it and disrupt user processes. There is also no prior art of a stackable filesystem that provides a uniform Unix-like interface for the other layers in the stack. Prior art is also silent about preventing other applications to bypass it while accessing data in the underlying filesystems. There are also no teachings in the prior art about configuring users to access encrypted files in the stackable filesystem in their ciphertext form for backup purposes.

OBJECTS OF THE INVENTION

In view of the shortcomings of the prior art, it is an object of the invention to provide techniques for a stacking or stackable filesystem that can be configured to perform a variety of operations on its files and directories.

It is also an object of the invention to configure such a stacking/stackable filesystem at runtime, and without unmounting it and causing disruption to the processes using it.

It is further an object of the invention to provide a uniform/standardized interface for the stacking filesystem so other applications/modules using it, need not be customized.

It is also an object of the invention to prevent other applications from directly accessing the underlying filesystem of the stacking filesystem and thus bypassing it.

It is still another object of the invention to allow configured users to access encrypted files in their ciphertext form in the underlying filesystem of the stacking filesystem for backup purposes.

Still other objects and advantages of the invention will become apparent upon reading the summary and the detailed description in conjunction with the drawing figures.

SUMMARY OF THE INVENTION

A number of objects and advantages of the invention are achieved by apparatus and methods for a configurable stacking or stackable filesystem (CSF) based on the instant principles. The computer system or computing environment that an instant CSF operates in, has a kernel space that is reserved for privileged system processes and a user space that is meant for user processes, client applications and any other user-level applications/utilities.

There are one or more block-level storage devices that operate in the kernel space. These block-level storage devices are responsible for storing data in physical storage systems such as disks, tapes, flash drives, solid state drives (SSDs), etc. and are accessible via a lower-level filesystem. The lower-level filesystem may be an XFS, Extended Filesystem 3 (EXT3), EXT4, Global Filesystem GFS2, Journaling Filesystem (JFS) from International Business Machines (IBM™), JFS2, etc.

According to the chief aspects, the instant CSF operates in the kernel space and interacts with the lower-level filesystem via a standardized/uniform and preferably Unix or Unix-like virtual filesystem (VFS) interface. Furthermore, the CSF interacts via its VFS interface with one or more client applications operating in the user space. Instant CSF is a configurable and stackable filesystem because it can be configured to provide a number of operations/capabilities for files and directories residing in the filesystem.

The various operations that the CSF performs on its files and directories are specified in its configuration or its configuration file. These operations include but are not limited to: logging or monitoring of various file/directory level activities including changes in permissions and access control lists (ACL or acl), encryption, compression, rate-limiting and time-of-use restrictions, etc.

A unique advantage of the present technology is that the configuration file specifying various operations to be performed on files/directories in CSF can by dynamically loaded into the CSF at runtime. What this means is that configuration changes can be made to CSF dynamically without unmounting it and disrupting the processes using it, as is the case in the prior art.

Preferably, the configuration file or simply config file for the instant CSF is a human-readable/editable text file, but it can also be a binary file or be in any other suitable file format. An instant configuration load utility or mechanism operating in the user space is responsible for dynamically loading the configuration into the CSF at runtime and without requiring to unmount it. If the configuration is a text file, the configuration load utility first compiles or converts the text file into a machine-readable binary or in other words, a compiled configuration file.

In the preferred embodiment, the configuration utility accomplishes its objectives by writing an updated (and compiled if necessary) configuration file, as a virtual file to sysfs. From sysfs, the virtual file is read and loaded by the CSF. In addition or instead, the configuration load utility may also load the configuration by making one or more ioctl (short for input/output control) system calls. Still other variations employ configfs system call for the loading of the configuration into the CSF.

In the preferred embodiment, instant CSF implements monitoring and logging or monitoring/logging or simply logging operation for short by interfacing with a low-latency logging subsystem operating in the kernel space. In turn, the low-latency logging subsystem interacts with a global log analysis by providing it the logs/events monitored by the CSF. Also referred to as an event monitoring system or a security information and event management (SEIM) system, the global log analysis/analytics system operates in the user space and likely on an anther host system.

Since CSF governs all access to its files/directories via its VFS interface, it is able to monitor and log any file or directory level activity, including acl and permission changes.

Furthermore, instant CSF can also perform any rate-limiting and/or time-of-use restriction operations specified in the config file.

The global log analysis system is responsible for gathering events and logging data from the instant low-latency logging subsystem as mentioned above. It also receives logging data and other events from a variety of other sources in the organization which the above computer system is a part of. It then performs analytics on the logging and events data for identifying potentially harmful patterns and threats.

In the same or another embodiment, instant CSF implements encryption operation by first interacting with a key manager to obtain encryption keys for the files/directories that are configured/specified to be encrypted in the config file. This encryption may be performed on top of an already existing encryption regime of the underlying lower-level filesystem, including partition encryption.

As a consequence of the instant design, all file/directory or data access requests to the files/directories in the underlying filesystem must go through the VFS interface of the CSF. In other words, any direct access to the underlying filesystem and consequently to files in the physical storage systems via block-level storage devices, is prevented—whether or not the CSF is mounted.

The instant CSF accomplishes this bypass prevention capability by scrambling, obfuscating or encrypting the inode numbers and/or the contents of the files/directories in the underlying lower-level filesystem. Furthermore, the CSF preferably allows a configured user or set of users, who may not necessarily have root privileges, to be able to access encrypted files in the lower-level filesystem in their encrypted/ciphertext form. This enables the present design for these configured users to be able to backup those encrypted files without having to decrypt them first.

In a highly preferred set of embodiments of the present technology, the instant CSF itself is implemented as a number of stackable layers or individual CSFs each with its own VFS interface. Each CSF in the stack specializes in and is responsible for implementing a given type of operation specified in one or more configuration files. Any operations not implemented by a CSF are simply ignored or passed through by it to the other CSFs in the stack. Such a modular design allows for ease of implementation of an individual CSF by focusing on a single capability/operation at hand.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The techniques described herein may employ computer code that may be implemented purely in software, hardware, firmware or a combination thereof as required for a given implementation. The present invention will be best understood by first reviewing the systems and methods of a computing system/environment 100 using a configurable and stacking or stackable filesystem (CSF) 102 based on the instant principles as illustrated in FIG. 1.

Figure 1:
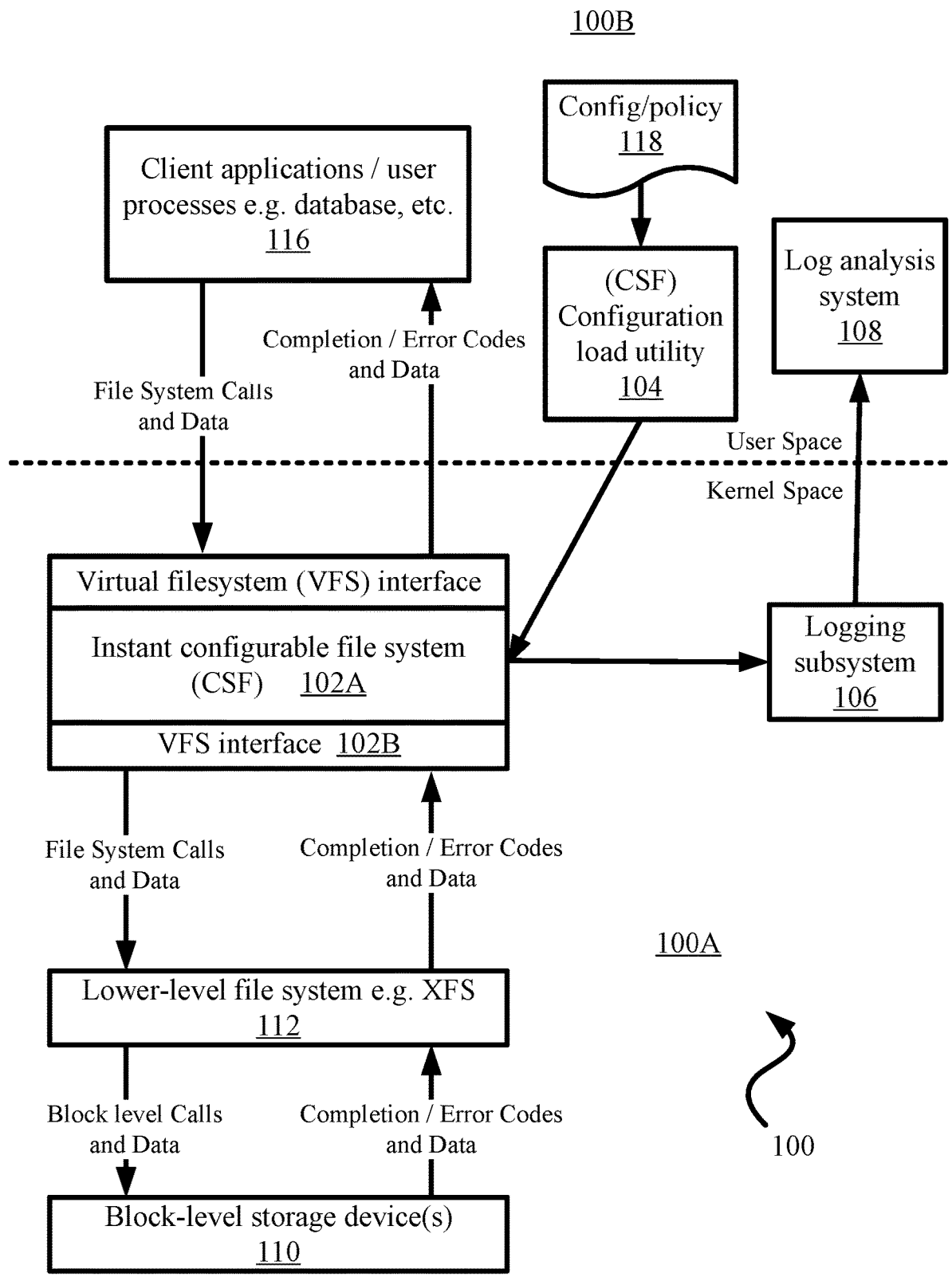
FIG. 1 shows an architectural diagram 100 of a computer system employing an instant configurable stackable/stacking filesystem (CSF) along with other subsystems/modules.

More specifically, FIG. 1 illustrates a computer system or computing environment 100 that has various modules and subsystems operating in a user space 100A and a kernel space 100B as shown. Those familiar with computer systems with understand that kernel space refers to that portion of the computer memory and address space that is reserved for running privileged operating system processes, including the kernel itself, kernel modules and extensions, and most device drivers. In contrast, the user space is the portion of address space where application software including any user-level applications or simply client or user applications, any user-level utilities and some device drivers execute. As shown in FIG. 1, instant CSF 102A operates in kernel space 100A and is thus a privileged process.

Let us now understand the operating environment or computer system 100 of FIG. 1 in great detail. FIG. 1 shows one or more low-level block storage devices 110 that are responsible for storing data in physical storage systems such as disks, tapes, flash drives, solid-state drives (SSD), etc. There is a lower-level filesystem 112 that operates in kernel space 100A above block-level storage device(s) 110. Examples of lower-level filesystem 112 include but are not limited to XFS, Extended Filesystem 3 (EXT3), EXT4, Global Filesystem GFS2, Journaling Filesystem (JFS) from International Business Machines (IBM™), JFS2, etc. Filesystem 112 can in practice be any storage layer that presents a standard Unix filesystem-like interface to CSF 102.

Filesystem 112 interacts with block-level storage device(s) 110 via block-level calls and any associated data as required for the application programming interface (API) of the device drivers of devices 110. As shown, in response, it receives completion codes, which may be error codes, and any associated data from the device drivers of devices 110.

The instant configurable stacking/stackable filesystem (CSF) 102A interfaces at the lower-level with low/lower-level filesystem 112 in kernel space 100A and at the upper-level with one or more client applications or user processes 116. However, CSF uses the interface of a virtual filesystem (VFS) 102B to interact with higher-level client applications 116 and lower-level filesystem 112. In other words, CSF 102A interfaces with its upper and lower layers in computer system 100 via VFS interface 102B.

The main advantage of VFS interface 102B is that it provides a standardized and uniform filesystem interface for CSF 102A to interact with client applications 116 on one hand, and lower-level filesystem 112 on the other. Preferably, the uniform/standardized VFS interface 102B afforded to CSF 102A is a Unix or Unix-like interface. In a manner analogous to the interaction between lower-level filesystem 112 and block-level storage devices 110, client applications 116 interact with CSF 102A via VFS interface 102B and CSF 102A interacts with filesystem 112 via VFS interface 102B. In other words, these modules/layers interoperate by making respective filesystem calls with any associated data, and by receiving resulting completion/error codes and any associated data, as shown.

Per above discussion, CSF 102A "implements" VFS interface 102A so as to allow other modules and subsystems to interact with it. This design enables a standardized implementation of any client code or client applications or users processes 116 that wish to take advantage of CSF 102A. According to the chief aspects, CSF 102A is an innovative stacking or stackable filesystem that can be uniquely configured to provide a number of operations or capabilities for files and directories residing in it.

Note that it is convenient and customary to simply state that the directories/files reside/or are stored in CSF 102A. However, it is important to understand that they are ultimately stored via block-level storage devices 110, and specifically via their device drivers, in physical storage systems such as disks, tapes, flash drives, SSDs, etc. Block-level storage devices 110 are accessible via lower-level filesystem 112.

Per above, since VFS 102B provides a standardized Unix or Unix-like interface to CSF 102A, an innovative aspect of the present design is that applications 116 or lower-level interactions with filesystem 112 need not be changed/customized or be non-standard. Therefore, other layers in the architecture of computer system 100 can take advantage of the benefits provided by CSF 102A completely transparently. The benefits afforded by instant CSF 102A include a variety of operations that may be performed on individual files and directories residing/stored in CSF 102A. Note that there may or may not be any additional intervening kernel code that gets transparently executed when client applications 116 make filesystem calls through VFS 102B.

Now, each of these operations provided or implemented by CSF 102A can be configured to be performed or specified on a per-directory or a per-file basis. In various embodiments, these operations include but are not limited to:
1. Monitoring/logging operations, including monitoring/logging of access control list (ACL or acl) activities. For brevity, we may refer to monitoring and logging operations by just logging operation with the knowledge that logging requires and subsumes monitoring.
2. File encryption operation.
3. File compression and decompression or uncompression operations.
4. Operations for rate-limiting and time-of-use restrictions for client applications.

A policy or a configuration 118 for CSF 102A shown in FIG. 1 can be used by an administrator to define as to which of the above operations need to be performed for which directories and files. Conversely, the configuration/policy can also specify which operations will not apply to the specified directories and files.

This allows the administrator to require, for example, encryption for some files in the filesystem but not for all. Thus, performance penalty for encryption only occurs for applications that use files which require encryption. The same is true for logging or monitoring. Monitoring and logging a file activity such as a file read for a large file may result in logging of a large number of log messages, and consequent network traffic and performance penalty. However, monitoring only for file open or access operations will result in a lot fewer log messages and thus, a lower performance impact.

Depending on configuration/policy 118, when CSF 102A of FIG. 1 is not performing any operation on a directory/file, it has a negligible or minimal performance impact in and of itself. In such a scenario, it appears essentially transparent to client applications 116.

Let us now understand how a configuration or policy 118 for CSF 102A is defined. The configuration file or simply configuration or policy 118 is loaded into CSF 102 as will be explained further below. As a key innovation of the present design, configuration 118 can be loaded into CSF 102A at runtime without unmounting filesystem 102 and disrupting the client applications.

Each line or entry of configuration file or simply configuration or policy 118 first specifies a directory or file and then its configuration flags which specify what operations need to be performed on the file or on the files in the directory. A directory is specified relative to the mount point. In other words, if the filesystem is mounted at mount point /data and directory /data/abc needs monitoring/logging, then the configuration entry will start with the directory name abc.

Therefore, this directory entry will apply to all files under the directory tree starting with abc including all its subdirectories, their subdirectories and so on.

Consequently, files are specified with their paths relative to the directory that they are in. Thus, a configuration entry specifying a file /data/abc/zyz in directory abc of the above example, will be specified as abc/xyz. A file or directory entry may be specified with wildcards and regular expressions known in the art and may thus refer to multiple files and directories. Configuration flags specified with each configuration entry determine what operation needs to be performed for the specified file(s) or the files in the specified directory/directories.

In an exemplary implementation, a comment line starts with a "#" in configuration file 118. Of course, in this example, configuration file 118 is a human-readable or text file and easily editable by authorized users. In some variations, configuration/policy file 118 is also digitally signed so as to be secured against malicious or inadvertent modifications.

Based on the instant principles, a configuration load utility or mechanism 104 to be discussed further below first compiles a text configuration file 118 into a machine-readable data structure or a binary file before loading it into the kernel. In alternative embodiments however, configuration 118 may be a binary file that is edited via a specialized user interface (UI). Such a UI may be a command line interface (CLI) or a graphical user interface (GUI).

Let us now review the configuration flags for various operations (1) through (4) above that may be performed by CSF 102A in a preferred implementation.

Monitoring/Logging and Acl Operations Flags:
  perm: Log permission errors.
  read: Log opens for read.
  read+: Log all read operations. Per above, this may produce a large amount of logging data and network traffic.
  write: Log opens for write.
  write+: Log all write operations. This may also produce a large amount of logging data and network traffic.
  creat: Log directory/file creation.
  rm: Log directory/file deletion.
  acl: Log any permissions changes.

Exemplary Entries of Configuration/Policy 118 with Monitoring/Logging:
  # This configuration entry specifies that user directories are to be monitored for permission violations. Note that directory users is being specified under its mount point per above. This configuration entry will be applied to all home directories under users directory:
  users: perm
  # This configuration entry specifies that user fred is to have no monitoring of his home directory. That is why there are no configuration flags specified for his home directory below:
   users/fred:
   # This configuration entry specifies that all files in directory database/files and all its subdirectories under that directory tree, are to be monitored for a variety of activities as specified below:
      database/files: perm,creat,rm,acl
   # This configuration entry specifies that file accounts in directory users/john needs to monitored for any permissions changes:
      users/john/accounts: acl
Encryption Operation Flags:
   ENC: Encrypt files. Additional flags may specify an encryption key and/or which encryption algorithm to use. The specified files are automatically/transparently decrypted upon reading.
Exemplary Entry of Configuration/Policy 118 with Encryption:
   # This configuration entry specifies that all files under the directory tree payroll are to be encrypted:
      payroll: ENC <encryption key and/or encryption algorithm>
Compression Operations Flags:
   COMP: Compress files. Additional flags may specify which compression algorithm to use. The specified files are automatically/transparently decompressed/uncompressed upon reading.
Exemplary Entry of Configuration/Policy 118 with Compression:
   # This configuration entry specifies that files under the directory tree archive are to be compressed:
      archive: COMP
   In a similar fashion, rate-limiting and/or time-of-day use restrictions operations may be specified for various directories and files.
Flags for Rate-Limiting Restriction Operations:
   The present technology can rate-limit the following operations: open, read, write. More specifically, following flags can be specified:
      open: open=NN/[time period], where NN is a number. time periods can be s(second), m(minute), h(hour), d(day).
      read and write: <read|write>=NN[units]/[time period], where units are K, M, G, T, P for kilobytes, megabytes, gigabytes, terabytes, petabytes, respectively and so on.
Exemplary Entries of Configuration/Policy 118 with Rate-Limiting Restrictions:
   # This configuration entry specified that there is no rate-liming for the root user:
      users/root:
   # The configuration entry specifies that guest users cannot open or write files:
      users/guest/*: open=0/s,write=OK/s
   # The configuration entry specifies that customer service users have tight/strict rate-limits:
      users/custsvc/*: open=10/h,read=1M/h,write=1M/h
   # The configuration entry specifies that all other users have default rate-limits:
      users/*: open=20/s,read=2M/s,write=1M/s
Flags for Time-of-Use Restriction Operations:
   Rate-of-use restriction flags utilize a 24-hour clock. These restrictions are specified with the following flags:
   <day specifier>=[hour-hour[,hour-hour] . . . ]
Exemplary Entries of Configuration/Policy 118 with Time-of-Use Restrictions:

The configuration entry specifies that there are no time-of-use restrictions for the root user:
      home/root:
   # The configuration entry specifies that customer service users work Monday through Friday, 8 am-6 pm:
      home/custsvc: M-F=8-18
   # The configuration entry specifies that all other users have no time-of-use restrictions:
      home/*:
   Let us now review the implementation details of above operations (1) through (4) performed by CSF 102A in even greater detail.
1. Implementation of Monitoring/Logging and Acl Operations:
   In the preferred embodiment, monitoring, logging and ACL/acl operations specified in configuration 118 above, are performed in a low-latency or highly efficient logging subsystem 106 shown in FIG. 1. This results in a minimal performance impact to client applications or user processes working on directories/files that are specified in configuration 118 to be monitored. Subsequently, logs from logging subsystem 106 operating in kernel space 100A are preferably transmitted to a central/centralized or global logging and/or log analysis system 108.
   Also sometimes referred to as an event monitor, log analysis system 108 receives logs and events from all/most other computer systems inside the firewall of the organization operating computer system 100 of FIG. 1, and not just system 100. Furthermore, it also receives logs/events from the network perimeter systems including the firewall. These logs preferably capture a variety of events across the entire computing network of the organization, including key usage events, network usage events, events capturing the use of privileged/root commands, anti-virus system events, etc.
   Furthermore, the event data consumed by analysis system 108 also includes any relevant data associated with the logging events, including date/timestamp of each event, its type, severity, process id(s) associated with the event, identifiers of associated machines and network interfaces, etc. Log analysis or event monitoring system 108 then correlates the data from all these events recorded in logs received from a variety of sources and performs analytics. Consequently, it is able to identify patterns of malicious or bad/improper behavior across the entire network.
   As an example, let us consider that the events captured by monitoring/logging operations of an instant CSF, such as CSF 102A of FIG. 1, on one host signify an unusually heavy activity from a database. Similarly, events captured by monitoring/logging operations by an instant CSF on another host signify unusually large reads and writes from a user.
   In addition, let us consider that log analysis system or event monitor 108 also sees unusual outbound network activity around the same time. Now, each such observation in its own right may not be concerning, but when correlated together by log analysis system 108, they may indicate the possibility of an insider attack and data exfiltration. If such a determination is made by log analysis system 108, it raises appropriate alerts and notifies the designated parties or other security systems/applications.
2. Implementation of Encryption/Decryption:
   In the preferred embodiment, CSF 102A is implemented on top of a lower block-level partition encryption scheme. This allows for a default minimal level of encryption for the filesystem. In such a scenario, by using the above-described encryption operation flags in configuration 118, a higher-level encryption regime may be further prescribed for files/directories on the same encrypted partition.
   The decryption of files happens automatically and transparently for client applications 116 as encrypted files are read. An appropriate key management system or key manager not shown explicitly in FIG. 1 is preferably utilized for key management. Preferably, the key manager is key management interoperability protocol (KMIP)-compliant. CSF 102A would interact with the key manager for various key management tasks/activities including obtaining keys for encrypting the files and directories specified to be encrypted in configuration 118.

3. Implementation of Compression/Uncompression Operations:

In an analogous fashion to encryption, compression and decompression or uncompression is also implemented in/by CSF 102A. In other words, a compression engine transparently compresses the files/directories using a default or a specified compression algorithm. When the files/directories are read back by user processes 116, the files are transparently uncompressed or decompressed.

4. Implementation of Rate-Limiting and Time-of-Use Restriction Operations:

Since all access to files and directories in computer system 100 has to be performed via system calls to CSF 102A and more specifically its VFS interface 102B, CSF 102A thusly governs all access to them. Consequently, it can implement rate-limiting and time-of-use restriction operations for them. As an example of rate-limiting, a certain database directory specified in a configuration entry of config file 118 may be configured to be accessible by user processes 116 at most 50 times in one day. As an example of time-of-use restriction, a certain banking system directory may be specified to be accessible by client applications 116 only during the weekdays.

Loading of Configuration at Runtime:

One of the chief innovations of the present design is that configuration 118 can be loaded to CSF 102 dynamically at runtime and without disruption to client applications or user processes 116. Techniques of the prior art require unmounting the filesystem which requires stopping all processes that are using it. This disrupts normal activity. For example, if the prior art filesystem houses a database, then the database has to be shutdown which means all users of the database have to log off and stop working.

In contrast, the present design avoids such a disruption to normal business activity. It does so by being able to load configuration or policy 118 at runtime while the filesystem is mounted and operational/running, and any programs/process using it also operational/running. In the preferred embodiment, this is accomplished by utilizing a specialized configuration load utility/mechanism 104 shown in FIG. 1. Configuration load utility 104 operates in user space 100A as shown and utilizes a mechanism to load the configuration into the kernel at runtime. Per above, if configuration 118 is a text file, configuration load utility 104 compiles the human-readable configuration into a machine-readable form before loading it into the kernel.

In one embodiment, load utility 104 accomplishes this by making a specialized ioctl system call. Those skilled in the art will understand that in computing, ioctl (abbreviation of input/output control) is a system call for invoking device-specific input/output operations or other operations that may not be performed by regular system calls.

ioctl takes a parameter specifying a request code, and the effect of the call depends entirely on the request code. Based on the request code, ioctl may take additional parameters that determine the behavior of the call for the specified request code. Thus, in the present embodiment, configuration load utility 104 invokes ioctl with a request code that is specific to CSF 102A, e.g. "CSF". It then specifies a load command and the name of config file 118 that needs to be loaded into the kernel and more specifically to CSF 102A operating in kernel space 100A. If config file 118 was initially in text form, then configuration load utility 104 converts or compiles it to a binary form that can be loaded into the appropriate data structures of the kernel, and more specifically CSF 102A.

In an alternative embodiment, configuration load utility 104 uses the sysfs mechanism for loading config/configuration file 118 into CSF 102A. Those skilled in the art will know that sysfs is a pseudo-filesystem provided by the Linux kernel. It is used to export information on various kernel modules and subsystems. These include hardware devices and associated device drivers. The information is exported from kernel space 100A to user space 100B as virtual files. Furthermore, the virtual files can also be used for configuration of the devices.

Thus, in the present embodiment, load utility 104 writes a compiled form of configuration file 118 into sysfs as a virtual file(s). Once there, the virtual file is read by CSF 102A (more specifically, an instance of CSF 102A), which reads the compiled configuration and in turn writes it to an internal data structure. Then the pointer to the config data structure in the CSF instance currently in use is changed to point to the new data structure and the old one deleted. Once written to sysfs, the configuration is automatically and almost immediately loaded and effective.

Any of the above provided configuration loading schemes will dynamically load the configuration specified in config file 118 into CSF 102A. Once loaded, the configuration becomes immediately active and enforced. Since CSF 102A performs operations (1) through (4) described above based on the configuration in its memory, once the new/updated configuration has been loaded from config file 118 into its memory per above, it becomes immediately effective/active by CSF 102A. Therefore, using the present design, it is not required to unmount CSF 102A first and consequently stop all processes that are using it, then configure it and then mount it again. This avoids disruptions to normal business activity and is a major advantage of the present technology over the techniques of the prior art.

When CSF 102A is first installed and started, it is not operational until a configuration file has been loaded into it per above. The configuration file may be initially empty, thus requiring no operation to be performed. In such a scenario, CSF 102A initially acts simply as a pass through, with almost no performance impact to its upper layers.

Bypass Prevention:

CSF 102A provides access to underlying filesystem 112 since it is mounted on top of it. Thus, any client applications or user processes 116 that need to access filesystem 112, must utilize filesystem calls of VFS interface 102B for such access. In yet another innovative aspect of the present technology, CSF 102A prevents any direct access to filesystem 112 even when it is not mounted or even when a process tries to bypass it. Thus, any process 116 that wishes to directly access filesystem 112 while bypassing VFS interface 102B of CSF 102A, is prevented from doing so. As a result, operations such as monitoring/logging, including acl activities, encryption, compression, and any other operation specified in config file 118 cannot be bypassed.

A key benefit of this built-in bypass-prevention capability is that it enables an instant mounted CSF "mask" the underlying lower-level or backing filesystem. This is important so that if CSF 102A of FIG. 1, for any reason, does not mount or is unable to mount, it still hides lower-level filesystem 112. This prevents the host from booting, which then either shuts down or stays in single user mode and/or does not start any services that could have bypassed CSF 102A. This built-in bypass prevention of the design comes with no performance hit and is beneficial while the system is up and running.

In order to provide an additional level of security, in another embodiment, CSF 102A further performs bypass prevention by scrambling or encrypting inode numbers or directory names or filenames in underlying filesystem 112. Skilled artisans will understand that an inode (short for index node) is a data structure in a Unix-style/like filesystem which specifies a filesystem object such as a file or a directory. An inode stores the disk block locations where the object data is stored along with other attributes. These attributes include file metadata such as times of creation, last access, change, etc. as well as data about file permissions and owner.

A process wishing access to a directory or file must access its inode and for that it must know its inode number. Therefore, in the present embodiment, CSF 102A once mounted and installed, scrambles the inode numbers of the directories and files in filesystem 112. In one variation, it does so by encrypting the inode numbers by a secret key that is only known by CSF 102, or in other words, by an appropriate administrator. While allowing access to underlying directories and files through its filesystem calls, CSF 102A first decrypts the inode numbers with the same key and provides the access.

However, a process that wishes to bypass CSF 102A whether or not it is mounted, is unable to determine the correct inode number of the directory or file being sought, without decrypting the inode numbers first. As a result, it is unable to access the desired directory or file in filesystem 112. In other variations, CSF 102A may employ other mechanisms for scrambling or obfuscating the inode numbers so that only it can unscramble/decode it.

In another embodiment of the present design, CSF 102A also performs bypass prevention by encrypting the contents of the files. In this embodiment, CSF 102A transparently encrypts all directories/files in filesystem 112 using a key or keys that are only known to appropriate administrator(s). The data in filesystem 112 resides as ciphertext. When a process tries to bypass CSF 102 and directly access filesystem 112 it is unable to decrypt the data because it does not have the encryption key(s) that was/were used to encrypt it. When allowing access to the encrypted file contents in filesystem 112 via its VSF interface 102B, CSF 102A performs the necessary decryption using the same encryption key(s) that were used to encrypt it.

Figure 2:
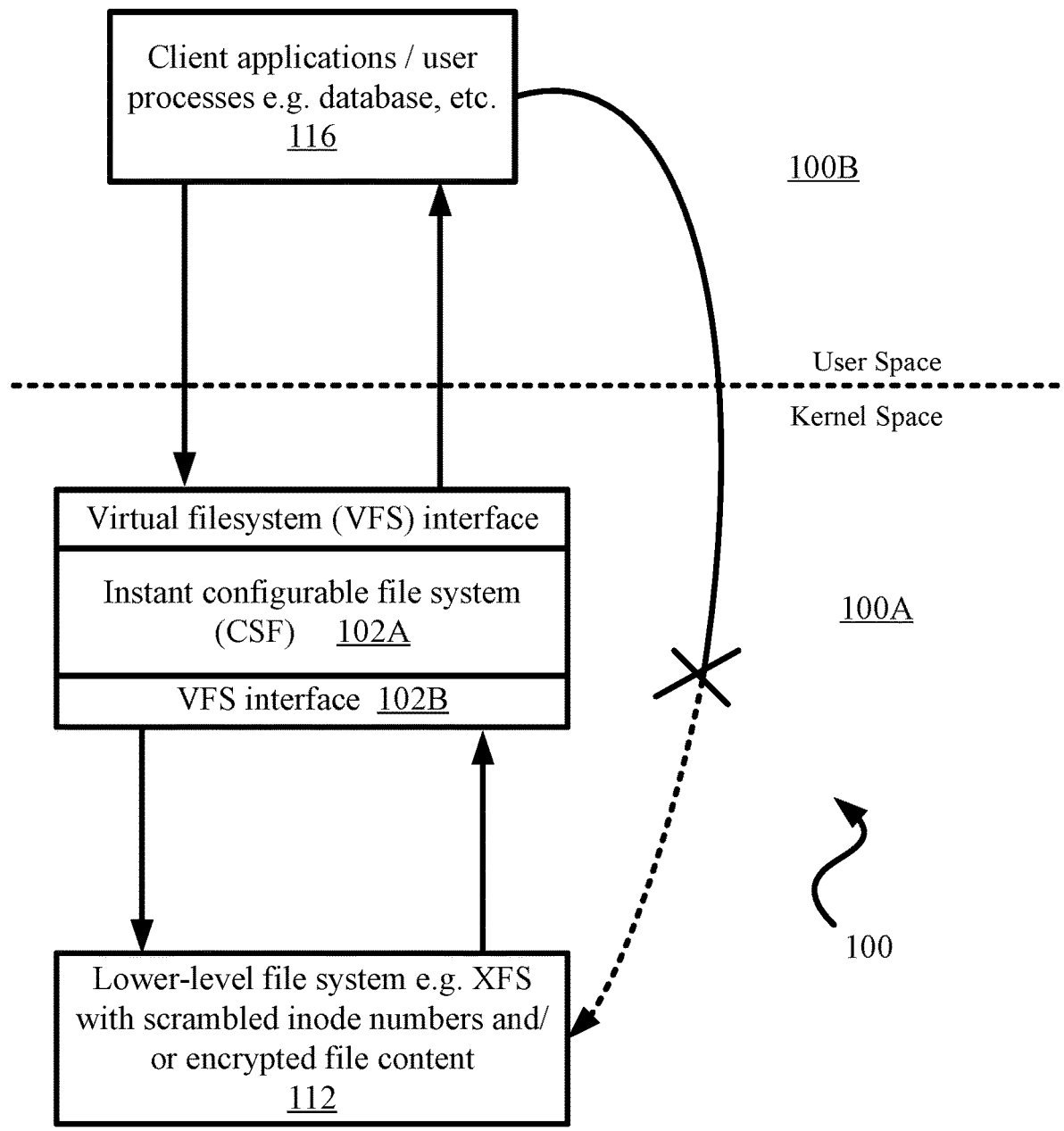
FIG. 2 illustrates the bypass prevention capability of the instant CSF in pictorial form.

FIG. 2 illustrates this bypass prevention capability of the present design in pictorial form. More specifically, FIG. 2 is a variation of FIG. 1 with many elements and reference numerals not repeated in order to maintain focus on the present teachings, but are presumed to exist. FIG. 2 shows a client application 116 trying to bypass CSF 102A and directly access its underlying lower-level filesystem 112 of the above teachings. However, since the inode numbers in filesystem 112 and/or the file contents are encrypted/scrambled as shown, client application 116 is unable to do so. This is depicted by the cross and the broken dotted-lined arrow.

Figure 3:
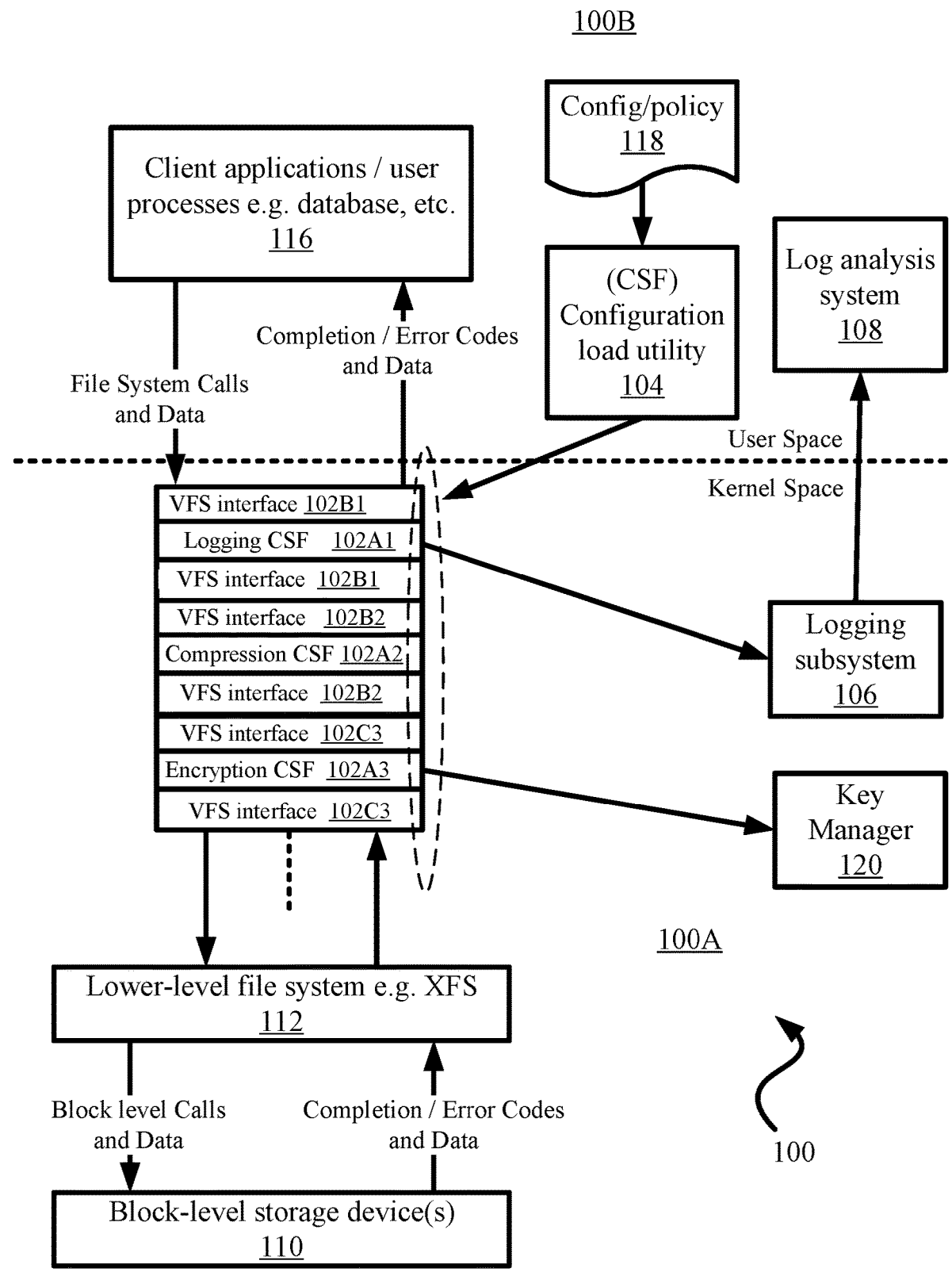
FIG. 3 is a variation of FIG. 1 where an instant CSF is composed of a number of stacked individual CSF layers or CSFs each specializing in a given type of operation.

Multi-Layered and Stackable Design:

In a highly preferred implementation of the present technology, configurable stackable filesystem (CSF) 102A of FIG. 1 is itself implemented as individual modular layers. Such an implementation is shown in FIG. 3. FIG. 3 is a variation of FIG. 1 where not all the reference numerals and elements from FIG. 1 are explicitly shown to avoid clutter, but are presumed to exist.

The main difference between FIG. 1 and FIG. 3 is that our configuration stacking/stackable filesystem CSF 102A now consists of a number of layers or individual CSFs in a stack. More specifically, there a number of CSFs 102A1, 102A2, 102A3, . . . , 102AN each interacting/communicating with the layers above and below, via respective VFS interfaces 102B1, 102B2, 102B3, . . . , 102BN as shown.

Logging CSF 102A1 is in charge of and specializes in performing logging operations as specified in config file 118. What this means is that CSF 102A1 simply passes through to its underlying filesystem CSF 102B1 in the stack, any other operations specified in the configuration stored in its memory (which was loaded from config file 118 per above), that are not monitoring/logging operations (1) described above.

For example, CSF 102A1 passes any compression operation configuration entries to compression CSF 102A2 via respective interfaces VSF 102B1 and VSF 102B2 respectively. Now, CSF 102A2 specializes in compression and it only performs compression operation specified in config file 118 while passing down all other operation specifications, such as encryption, to its underlying filesystem 102A3. Exemplarily, its underlying filesystem 102A3 is an encryption filesystem that specializes in encryption and only implements any encryption operations specified in config file 118, while passing all other operation specifications to any other underlying filesystems 102A.

Note, that it is important to layer encryption CSF 102A3 below any compression CSF 102A2, since as data is written, it should be compressed before encryption. Conversely, when it read, it should be decrypted first and then decompressed.

As shown by the thick dashed line, any number of such CSFs 102A1, 102A2, 102A3, 102A4, . . . 102AN can be stacked one on top of the other, and in any order, based on the modular implementation of the present embodiment. Such a design allows for ease and efficiency of implementation of each CSF layer. As a result, it is easy to develop and deploy an individual CSF that specializes in a specific type of operation in the filesystem.

Furthermore, in one variation, logging subsystem 106 now interacts only with logging CSF 102A1 as shown. However, in a preferred variation, CSFs other than logging CSF 102A in the CSF stack shown in FIG. 3, also log errors and consequently interact with logging subsystem 106. But these other CSFs do not perform the extensive monitoring/logging that is the specialty of logging CSF 102A. FIG. 3 also explicitly shows a key manager 120 that interacts with encryption CSF 102A3 for various key management activities. These include obtaining encryption keys for encrypting/decrypting files/directories configured to be encrypted in configuration file 118.

In one variation of the present embodiment, and as shown by the dashed ellipse in FIG. 3, configuration load utility 104 loads the configuration into all individual CSFs 102A-N from a single configuration file 118. It may do so in one operation or multiple. In another variation, configuration file 118 is broken into multiple configuration files 118A1, 118A2, 118A3, . . . , 118AN, each correspondent to an individual CSF 102A2, 102A3, 102A4, . . . 102AN. In such a scenario, each configuration file is used to specify configuration entries for one type of operation implemented by the corresponding CSF. Thus, config file 118A1 will specify only logging/configuration monitoring config entries. Similarly, config file 118A3 will specify only encryption config entries, and so on.

In this variation, config load utility 104 loads individual desired configuration(s) 118A-N to corresponding CSF(s) 102A-N, one or more at a time as needed. For this purpose, config load utility or mechanism 104 may again utilize one or more ioctl calls or sysfs of the above teachings. When using sysfs for loading multiple config files 118A-N at a given time, load utility 104 preferably writes compiled versions of these files as respective virtual files in sysfs.

Backing up an Encrypted CSF:

Let us consider the scenario of backing up directories/files that have been encrypted by instant CSF 102A of FIG. 1 or encryption CSF 102A3 of FIG. 3, based on the configuration specified in config file(s) 118 per above. Now, the encrypted files reside as ciphertext files in CSF 102 and more specifically in filesystem 112. Per above teachings, they are consequently stored in storage devices 110, and ultimately in physical storage systems, such as disks, tapes, drives and the like. Using the techniques of the prior art, a backup operation would necessitate decrypting these files first. In the prior art, if the entire filesystem is encrypted it would also be decrypted first before backing it up.

In other words, in the prevailing art, the encrypted files or directories would need to be decrypted first and brought into their plaintext form, before backing them up. This may violate active security policies of the computing environment. If it is the entire filesystem, then it would need to be unmounted and then backed up in the prior art. This causes undesirable disruption to the operation of the computing environment. Similarly, any open access to the underlying encrypted files could leave them susceptible to modification or corruption in the prior art.

However, the present technology overcomes these difficulties by allowing designated users and processes access to the underlying encrypted files in their encrypted/ciphertext form for backing up. The instant design accomplishes that by implementing a special ioctl request code. The resultant specialized ioctl call allows access to a designated user or users, who may or may not be root user, to be able to access files in their ciphertext form, for backup purposes.

Based on the present design, the above ioctl call can be made at runtime as various encrypted files are added/deleted from the filesystem and as backup requirements change. The designation of backup user(s) and the encrypted directories and files that the backup user(s) have access to is also preferably specified as one or more entries in config file(s) 118 discussed above.

The present technology thus affords a seamless and transparent experience to its overlying layers by implementing a variety of operations in respective CSF layers, while also supporting mission-critical activities such as backup. The instant design affords these benefits without loss of business continuity and without causing any disruptions to normal business activity per above teachings.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer system comprising computer-readable instructions stored in a non-transitory storage medium and at least one microprocessor coupled to said storage medium for executing said computer-readable instructions, said computer system further comprising:
   (a) one or more block-level storage devices operating in a kernel space of said computer system;
   (b) a lower-level filesystem operating in said kernel space storing data in said one or more block-level storage devices;
   (c) a configurable stackable filesystem (CSF) operating in said kernel space with a first interface to a client application in a user space and a second interface to said lower-level filesystem for said storing of data, said first interface and said second interface implementing a virtual filesystem (VFS) interface; and
   (d) a configuration prescribing said CSF to perform one or more operations on one or more files in said one or more block-level storage devices, said operations comprising logging, encryption, compression, rate-limiting and time-of-use use restrictions;
   wherein said configuration is loaded from a file into said CSF at runtime while said CSF is mounted and operational.

2. The computer system of claim 1, wherein said file is a text file.

3. The computer system of claim 2, wherein a configuration loaded utility is used to compile said configuration to a compiled configuration and wherein said configuration load utility loads said compiled configuration into said CSF.

4. The computer system of claim 3, wherein said configuration load utility writes said compiled configuration to a virtual file in sysfs, and wherein said virtual file is read by said CSF.

5. The computer system of claim 3, wherein said configuration load utility invokes an ioctl system call for loading said configuration into said CSF.

6. The computer system of claim 1, wherein said logging is performed by utilizing a low-latency logging subsystem operating in said kernel space.

7. The computer system of claim 1, wherein said low-latency logging subsystem sends logging events to an event monitoring system in said user space.

8. The computer system of claim 1, wherein said CSF prevents said client application from directly accessing said lower-level filesystem.

9. A computer system comprising computer-readable instructions stored in a non-transitory storage medium and at least one microprocessor coupled to said storage medium for executing said computer-readable instructions, said computer system further comprising:
   (a) one or more block-level storage devices operating in a kernel space of said computer system;
   (b) a lower-level filesystem operating in said kernel space storing data in said one or more block-level storage devices;
   (c) a plurality of configurable stackable filesystems (CSFs) operating in said kernel space each having a first interface for a client application in a user space and each having a second interface to said lower-level filesystem for said storing of data, said first interface and said second interface implementing a virtual filesystem (VFS) interface; and
   (d) a configuration prescribing each of said plurality of CSFs to perform an operation on one or more files in said one or more block-level storage devices, said operation including a logging operation, an encryption operation, a compression operation, a rate-limiting operation and a time-of-use restriction operation;

wherein said configuration is loaded from a file into said plurality of CSFs at runtime while said plurality of CSFs are mounted and operational.

10. The computer system of claim 9, wherein said configuration is specified in one or more files.

11. The computer system of claim 10, wherein a configuration load utility compiles said one or more configuration files and writes them as one or more virtual files to sysfs, from where they are read by one or more of said plurality of CSFs.

12. The computer system of claim 9, wherein said configuration is compiled and loaded into said plurality of CSFs by a configuration load utility.

13. The computer system of claim 12, wherein said configuration load utility invokes one or more ioctl system calls for loading said compiled configuration into said plurality of CSFs.

14. The computer system of claim 9, wherein one or more of said plurality of CSFs prevent said client application from directly accessing a file in said lower-level filesystem by scrambling an inode number of that file.

15. The computer system of claim 9, wherein a specialized ioctl call is invoked by a designated user to access a ciphertext of a file in said one or more block-level storage devices for performing a backup of said file in its ciphertext form.

16. A computer-implemented method executing by at least one microprocessor of a computer system, computer-readable instructions stored in a non-transitory storage medium coupled to said at least one microprocessor, said method comprising the steps of:
(a) operating one or more block-level storage devices in a kernel space of said computer system;
(b) operating a lower-level filesystem in said kernel space for storing data in said one or more block-level storage devices;
(c) operating a plurality of configurable stackable filesystems (CSFs) in said kernel space each having a first interface for a client application in a user space and each having a second interface to said lower-level filesystem for said storing of data, said first interface and said second interface implementing a virtual filesystem (VFS) interface;
(d) a configuration prescribing each of said plurality of CSFs to perform an operation on one or more files in said one or more block-level storage devices, said operation including a logging operation, an encryption operation, a compression, a rate-limiting operation and a time-of-use restriction operation; and
(e) loading said configuration from a file into said plurality of CSFs at runtime while said plurality of CSFs are mounted and operational.

17. The computer-implemented method of claim 16 performing said loading by a configuration load utility that writes said configuration as one or more virtual files to sysfs, from where they are read by one or more of said plurality of CSFs.

18. The computer-implemented method of claim 16 performing said loading by a configuration load utility that invokes one or more ioctl calls for said loading.

19. The computer-implemented method of claim 16 utilizing a low-latency logging subsystem operating in said kernel space for said logging.

20. The computer-implemented method of claim 16 interfacing said low-latency logging subsystem with a global security information and event management (SIEM) system in said user space.

* * * * *